US00RE38526E

(19) United States
(12) Reissued Patent
Hansinger et al.

(10) Patent Number: US RE38,526 E
(45) Date of Reissued Patent: Jun. 8, 2004

(54) ELECTROSTATIC ROTARY ATOMIZING SPRAY DEVICE WITH IMPROVED ATOMIZER CUP

(75) Inventors: Michael P. Hansinger, Olmsted Falls, OH (US); Jeffrey T. Conrad, Valley City, OH (US); Woodie R. Francis, Avon Lake, OH (US); Harold D. Beam, Oberlin, OH (US); Joseph J. Karbowniczek, Elyria, OH (US); Ronald R. Schroeder, Amherst, OH (US)

(73) Assignee: Nordson Corporation, Westlake, OH (US)

(21) Appl. No.: 09/947,069

(22) Filed: Sep. 5, 2001

Related U.S. Patent Documents

Reissue of:
(64) Patent No.: 5,947,377
Issued: Sep. 7, 1999
Appl. No.: 08/919,831
Filed: Aug. 28, 1997

U.S. Applications:
(63) Continuation-in-part of application No. 08/891,693, filed on Jul. 11, 1997, now abandoned.

(51) Int. Cl.[7] ..... B05B 5/04
(52) U.S. Cl. ..... 239/3; 239/224; 239/580; 239/600; 239/703
(58) Field of Search ..... 239/3, 223, 224, 239/580, 600, 690, 699–703; 901/43

(56) References Cited

U.S. PATENT DOCUMENTS 4,361,288 A * 11/1982 Fukuda et al. ..... 239/703
4,405,086 A * 9/1983 Vetter ..... 239/224
4,576,827 A * 3/1986 Hastings et al. ..... 239/690
4,723,726 A * 2/1988 Ooishi et al. ..... 239/703
4,838,487 A * 6/1989 Schneider ..... 239/223
4,866,987 A * 9/1989 Willson et al.
4,878,454 A * 11/1989 Cann ..... 239/703
4,887,770 A * 12/1989 Wacker et al. ..... 239/703
5,078,321 A * 1/1992 Davis et al. ..... 239/224
5,100,057 A * 3/1992 Wacker et al. ..... 239/223
5,188,290 A * 2/1993 Gebauer et al. ..... 239/3
5,433,387 A * 7/1995 Howe et al. ..... 239/703
5,474,236 A * 12/1995 Davis et al. ..... 239/703

FOREIGN PATENT DOCUMENTS

EP 0574305 * 12/1993
EP 0600397 * 6/1994

OTHER PUBLICATIONS

Fukata et al. "New Rotary Bell for Metallic Paint Application" Metal Finishing Oct. 1993 pp. 39–42.*

* cited by examiner

*Primary Examiner*—Steven J. Ganey
(74) *Attorney, Agent, or Firm*—Calfee, Halter & Griswold LLP

(57) ABSTRACT

An electrostatic, liquid spray, rotary atomizer has an atomizer housing, a power supply within the housing and an atomizer cup at a front end of the housing. The atomizer cup, which is formed of a non-conductive material, has several elongate conductive pathways embedded in the body of the cup. Each conductive pathway has one end exiting an outer surface at a rear end of the cup for receiving the charge from the power supply and another end exiting an inner surface at a front end of the cup for conveying an electrical charge from the power supply to the liquid (paint) particles passing through the atomizer cup. An electrode is provided for maintaining a small voltage at the access hole. The rotary atomizer with the improved charge ring and rotary cup can be mounted to a robot and connected to the liquid supply by an elongated spiral passageway to increase the electrical resistance between the atomizer and the liquid supply so that a very small electrical charge, if any, will be present in the passageway carrying paint to the rotary cup.

34 Claims, 9 Drawing Sheets

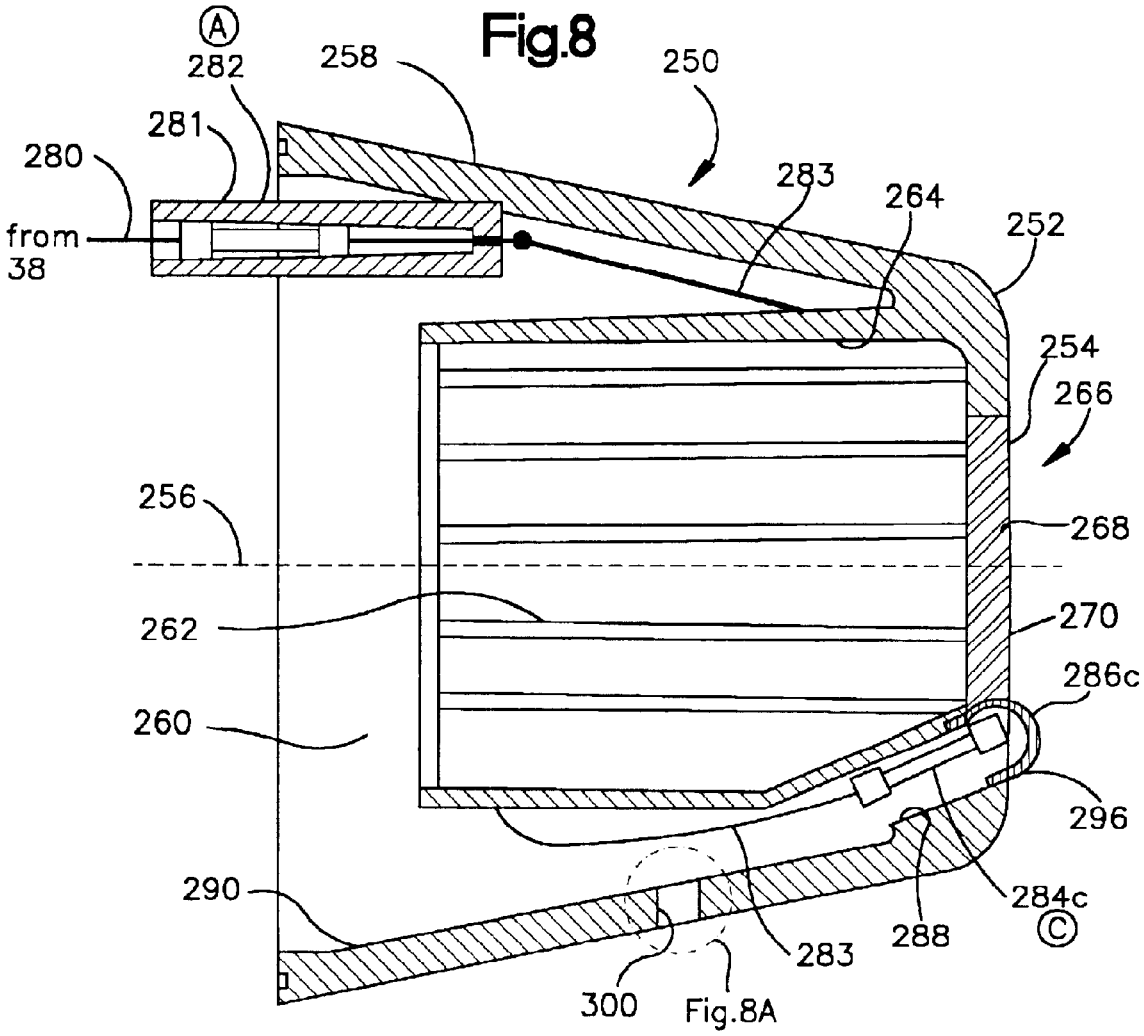
Fig.8
Ⓐ
282
258
250
281
280
283
264
from
38
252
254
266
256
268
262
270
286c
260
296
290
284c
Ⓒ
288
283
300
Fig.8A
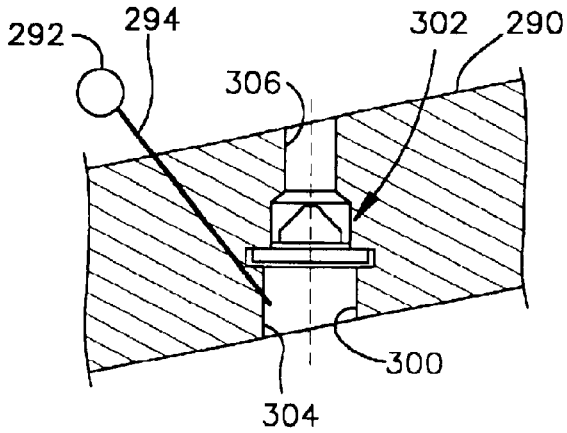
Fig.8A
292
294
302
290
306
300
304

250

A
282
D
284b
280
B
284a
256
286b
286c
286a
292 E
294
C
284c

292 E
294
32
A
282
284a B
286a
280
283
284c C
286c
284b D
286b

ELECTROSTATIC ROTARY ATOMIZING SPRAY DEVICE WITH IMPROVED ATOMIZER CUP

Matter enclosed in heavy brackets [ ] appears in the original patent but forms no part of this reissue specification; matter printed in italics indicates the additions made by reissue.

CORRESPONDING APPLICATION

This application is a continuation-in-part application of U.S. patent application Ser. No. 08/891,693 entitled ELECTROSTATIC ROTARY ATOMIZING SPRAY DEVICE WITH IMPROVED ATOMIZER CUP, filed Jul. 11, 1997.

RELATED APPLICATIONS

This application relates to U.S. patent application Ser. No. 08/834,290 entitled ELECTROSTATIC ROTARY ATOMIZING DEVICE, filed Apr. 16, 1997, which in turn is a continuation-in-part application of U.S. patent application Ser. No. 08/404,355 entitled ELECTROSTATIC ROTARY ATOMIZING SPRAY DEVICE, filed Mar. 15, 1995, and assigned to the common assignee with the present invention. This application also relates to U.S. patent application Ser. No. 08/264,606 entitled TRANSFER OF ELECTROSTATIC CHARGE THROUGH THE HOUSING OF A ROTARY ATOMIZING SPRAY DEVICE, filed Jun. 23, 1994, and assigned to the common assignee with the present invention.

FIELD OF THE INVENTION

This invention relates to a rotary atomizer device for spraying a liquid coating material and more particularly to a rotary atomizer device wherein high electrostatic charge is transferred from a power supply to an improved high speed atomizer cup secured to a shaft driven by an air turbine motor. The atomizing cup has conductive pathways for transferring electrostatic energy to the coating material without igniting the propane used in the FM 7260 test. The cup is secured to the turbine shaft to facilitate quick demounting of the cup for cleaning or replacement. The rotary atomizer can be mounted to a robot and connected to a liquid supply by an elongated spiral passageway.

BACKGROUND OF THE INVENTION

Rotary atomizers are a type of liquid spray coating device which includes an atomizer head rotatable at high speed (typically 10,000–45,000 revolutions per minute) by an air turbine motor to apply liquid coating material, such as paint, in atomized form onto the surface of a workpiece. The atomizer head is usually in the form of a disc or cup which includes an interior wall that defines a cavity and terminates in an atomizing edge. Liquid coating material delivered to the interior of the cup flows outwardly under centrifugal force along the interior wall of the cup and is expelled radially outward from the peripheral edge of the cup to form a spray pattern of atomized droplets of coating material. To improve the transfer efficiency of the coating process, an electrostatic charge is imparted to the coating material so that the pattern of atomized coating material is attracted to an electrically grounded workpiece.

An example of an electrostatically charged rotary atomizer is disclosed in commonly assigned U.S. Pat. No. 4,887,770 ('770) to Wacker et al., which is expressly incorporated herein in its entirety by reference.

Prior to the '770 patent, one of the hazards associated with the use of the conductive atomizing cup was the possibility of operator shock or ignition of combustible coatings because of the high voltage at which the cups were maintained. For example, as disclosed in U.S. Pat. No. 4,369,924, a charge is transferred through a turbine shaft from a power supply to the rotary atomizer cup. Since, both the cup and the entire rotary atomizing housing were metal and were charged to a high voltage, there is a significant safety hazard since the atomizer carries sufficient charge to severely shock an operator. Therefore, protective fences and interlocks have to be installed around the atomizer.

The '770 patent, listed before, discloses a low capacitance, rotary atomizer which, while electro-statically charging the coating paint at the rotary atomizer cup, does not store sufficient charge to present a shock hazard and therefore does not have to be protected by fences and safety interlocks. To charge the atomizer in the '770 patent, external electrode probes (462) direct the charge into the cup (20). Still, under certain strict testing conditions, a charge on the equipment could still cause some safety concerns.

Another problem associated with prior art rotary atomizers is that the rotary atomizer cups have not been easy to disassemble and clean. For example, in U.S. Pat. No. 4,838,487, a deflecting member (28) is held in place against atomizing bell (10) by spacers (36). However, in operation, dried paint can collect on the front surface (30) of the deflector member. Then, the flow of paint across the front surface with the dried paint has a tendency to form an irregular coating on the part being sprayed.

Still another problem associated with the prior art electrostatic spray guns was related to the isolation of the spray gun with the liquid supply. One solution, as described in U.S. Pat. No. 4,139,155 to Hastings was to provide a spiral conduit in the flow passage.

OBJECTS AND SUMMARY OF THE INVENTION

It is an object of the present invention to provide an improved electrostatic rotary atomizing spray device as defined in one or more of the appended claims and, as such, having the capability of being constructed to accomplish one or more of the following subsidiary objects.

It is another object of the present invention to provide a rotary atomizer device for spraying a liquid coating and method of operating same wherein an improved rotary cup has a plurality of conductive pathways for transferring electrostatic energy to the paint without igniting the propane used in the FM 7260 test.

Still another object of the present invention is to provide a rotary atomizer device for spraying a liquid coating and method for assembling the device the atomizing head or cup can be easily removed from the atomizer device for cleaning.

It is still a further object of the present invention to provide an apparatus and method for transferring charge to a high speed atomizer head or cup through a charge ring mounted to the front of the rotary atomizer housing so that the charge is dissipated to prevent the need for protecting an operator from being shocked.

Still another object of the present invention is to provide an access hole in the charge ring for insertion of a tool to restrain free rotation of the turbine shaft to which the atomizer cup is secured to facilitate quick demounting of the atomizer cup for cleaning or replacement.

Yet another object of the present invention is to provide an additional electrode in the electrical circuit for transferring charge from the power supply to the atomizer cup through a charge ring, wherein the additional electrode is disposed in the access hole of the charge ring for presenting a low voltage in the vicinity of the access hole that provides a small spark which is insufficient to ignite the propane used in the FM 7260 test.

Still another object of the present invention is to mount the rotary atomizer with the improved charge ring and rotary cup to a robot and connected to the liquid supply control valve by an elongated spiral passageway to increase the electrical resistance between the atomizer and the liquid supply so that a very small electrical charge, if any, will be present in the passageway carrying paint to the rotary cup.

According to an embodiment of the invention, a rotary atomizer cup of an electrostatic, liquid spray, rotary atomizer has several elongate conductive pathways which are embedded in the body of the cup that is formed of a non-conductive material. Each conductive pathway has one end exiting an outer surface at a rear end of the cup for receiving the electrical charge from the power supply. Each conductive pathway has another end exiting an inner surface at a front end of the cup. The conductive pathways convey at electrical charge from the power supply to liquid (paint) particles passing through the atomizer cup. A number of conductive extensions are embedded in a frustroconical front portion of the cup. Each conductive extension has a first end portion contiguous with the inner surface, exiting end of selected ones of the conductive pathways and a second opposite end portion exiting an outer surface of the frustroconical front portion of the cup. The conductive extensions also have a second opposite end portion exiting an inner surface of the frustroconical front portion of the cup.

According to an aspect of the invention, an annular charge ring mounted to the front portion of the atomizer is configured to accommodate the atomizer cup with the conductive pathways and extensions. The charge ring has an access hole for facilitating insertion of a tool for restraining free rotation of the turbine shaft to which the atomizer cup is secured to facilitate quickly demounting the atomizer cup for cleaning or replacement. An electrode disposed within the access hole and electrically connected to the electrical circuit presents a low voltage in the vicinity of the access hole for providing a small spark that is insufficient to ignite the propane used in the FM 7260 test. In order that the access hole does not compromise the air-tightness of the atomizer housing, a duckbill valve is provided in the access hole.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 8 is a side view, in cross-section, of a charge ring component of the atomizer housing which is configured to accommodate the atomizer cup of FIGS. 5, 6 and 7 and which has an access hole for facilitating insertion of a tool for quickly demounting the atomizer cup from a turbine shaft to which it is secured, in accordance with the invention;

FIG. 8A is a side view, in cross-section of a duckbill valve disposed in the access hole in the charge ring of FIG. 8, in accordance with the invention;

DETAILED DESCRIPTION OF THE INVENTION ROTARY ATOMIZER

Figure 1:
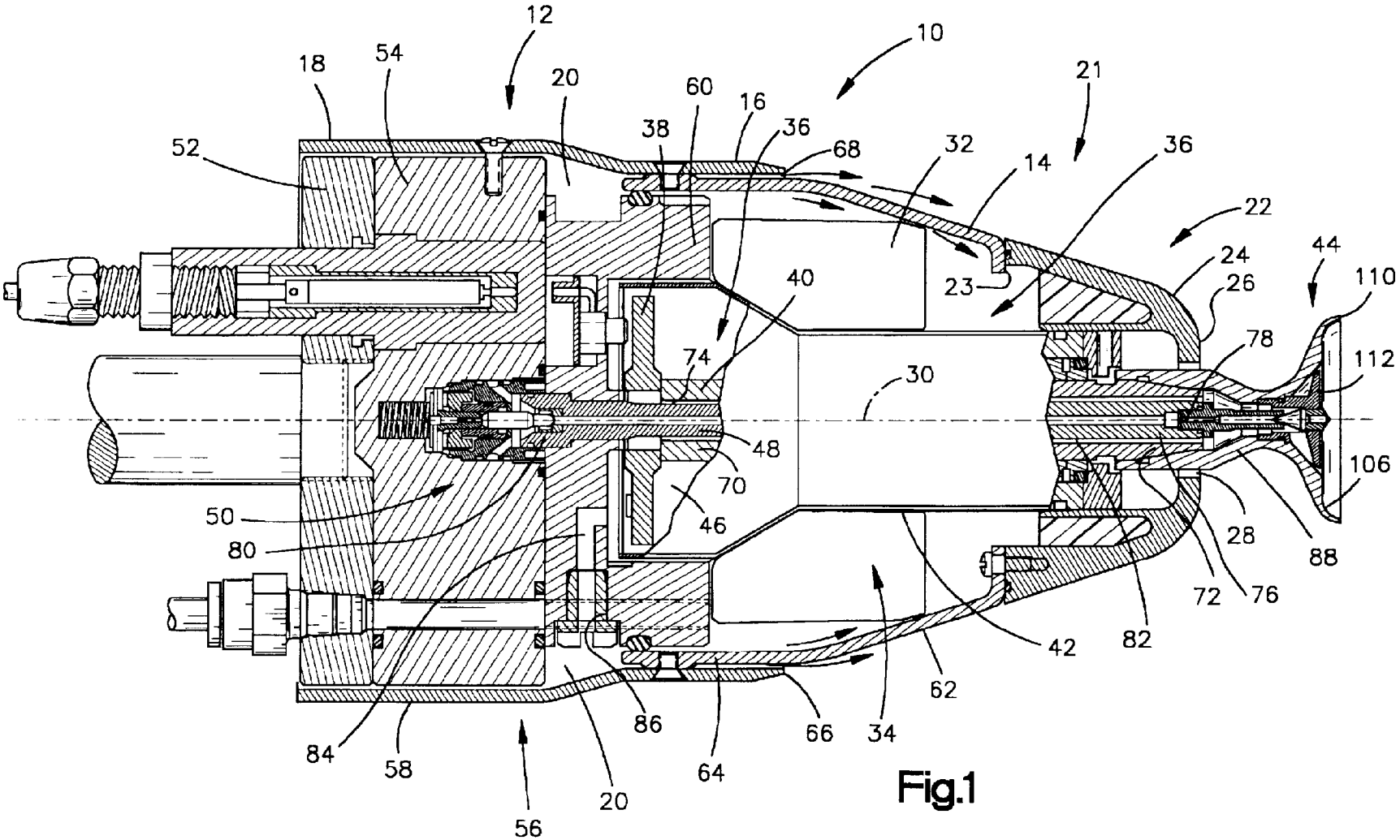
FIG. 1 is a cross sectional side view of an embodiment of a rotary atomizer.

Referring to FIG. 1, there is illustrated an electrostatic, liquid spray, rotary atomizer 10, which is very similar to the construction of rotary atomizers, described in detail in application Ser. Nos. 08/834,290 and 08/404,355, which applications are expressly incorporated in their entireties by reference herein, but with certain modifications in accordance with an additional embodiment of the invention. The rotary atomizer 10 includes an atomizer housing 12 having a forward section 14, an intermediate section 16, and a rear section 18 which collectively define an interior chamber 20.

An air control element 22, incorporating an annular charge ring 24, as shown in detail in FIG. 1, is detachably mounted to the forward section 14. Annular charge ring 24 has a front wall 26 provided with a circular bore 28 that is coincident with a longitudinal axis of rotation 30 that extends through atomizer housing 10.

An internal power supply 32, located within interior chamber 20, generates high voltage electrostatic energy in the range of from about 30,000 volts DC to about 100,000 volts DC. Power supply 32 is electrically connected to air control element 22 by electrically voltage transfer structure, as previously described in detail in application Ser. Nos. 08/834,290 and 08/404,355.

Rotary drive mechanism 34, located within the interior chamber 20 or rotary atomizer 10, is preferably an air driven type turbine motor 36 which includes internal air bearings (not shown), a driving air inlet (not shown), and a braking air inlet (not shown) for controlling the rotational speed of a turbine wheel 38, all of which components are well known in the art. Turbine motor 36 includes a rotary drive shaft 40 that extends through and is rotatably supported within a turbine housing 42. Rotary drive shaft 40 extends through circular bore 28 of annular ring 24 and has an atomizer cup or head 44 mounted at one end. Drive shaft 40 further extends into a turbine drive wheel housing 46 at the opposite end and is connected to turbine wheel 38.

A stationary, liquid flow tube 48 extends completely through rotary drive mechanism 34, and is in fluid communication with an air operated valve 50 at one end and atomizing cup 44 at the opposite end for transferring a liquid coating from the valve 50 to the atomizing cup.

Referring to air turbine motor 36, a source of pressurized turbine drive air is connected by a passageway (not shown) through manifold plate 52 and valve plate 54 to the turbine wheel housing 46 to spin air turbine drive wheel 38 according to conventional practice. That is, the stream of turbine drive air is directed against the outer perimeter of drive wheel 38 to rotate the wheel about the longitudinal axis 30 extending through rotary atomizer 10. A source of brake air is also connected by a passageway (not shown) through manifold plate 52 and valve plate 54 to the turbine wheel housing 46 for application against upstanding brake buckets (not shown) projecting from the side face of turbine wheel 38.

The atomizer housing 10, as shown in FIG. 1, includes an outer casing 56 with a larger diameter rear end section 58 enclosing manifold plate 52, valve plate 54, and interface plate 60. Outer casing 56 also includes a tapered front end section 62 which has a cylindrical, rear end portion 64 received within the open front end 66 of the rear end section 58 of outer casing 56. An air gap 68, as shown in FIG. 1, formed by the spacing between the large diameter front end 66 of rear end section 58 and the smaller diameter cylindrical rear end portion 64 of front end section 62, provides an exhaust path for a portion of the air exhausted from the turbine wheel housing 46, as discussed in more detail below.

DRIVE SHAFT AND FEED TUBE

The hollow motor drive shaft 40, connected at a first end 70 to turbine wheel 38 disposed in the turbine wheel housing 46 of rotary drive mechanism 34, extends forward along axis of rotation 30 to traverse the entire length of rotary drive mechanism 34 so that the opposite second end 72 of drive shaft 40 projects outward through circular bore 28 of annular charge ring 24. The second end 72 of drive shaft 40 has a threaded section (not shown) and a frustroconically shaped end adapted to securely attach rotary atomizer head 44. Motor drive shaft 40 has a throughbore 74 which is aligned with axis of rotation 30 and extends the length of the drive shaft. A device for supplying coating material, typically paint, includes a removable coating material feed tube 48 which extends the length of throughbore 74. Tube 48 has a first end 76 which communicates with the interior of atomizer cup 44 and which preferably carries a removable nozzle 78. An opposite second end 80 of feed tube 48 is removably mounted to valve 50, as generally shown in FIG. 1. When disposed in throughbore 74 of drive shaft 40, feed tube 48 is supported in cantilever fashion free of contact from the interior wall of bore 74, as disclosed in the 5,100,057 patent, to form the cylindrically shaped air passage 82.

EXHAUST AIR

An air exhaust passageway 84 is connected at one end to the interior of turbine wheel housing 46 and has a restrictor plug 86 at the opposite end. While a single air exhaust passageway 84 is illustrated, it is within the scope of the invention to provide a plurality of spaced exhaust passageways, each containing a restrictor plug 86, as desired. A discussion of the flow of exhaust air is described with respect to FIGS. 22 and 23 of patent application Ser. No. 08/834,290.

ATOMIZER HEAD

Figure 2:
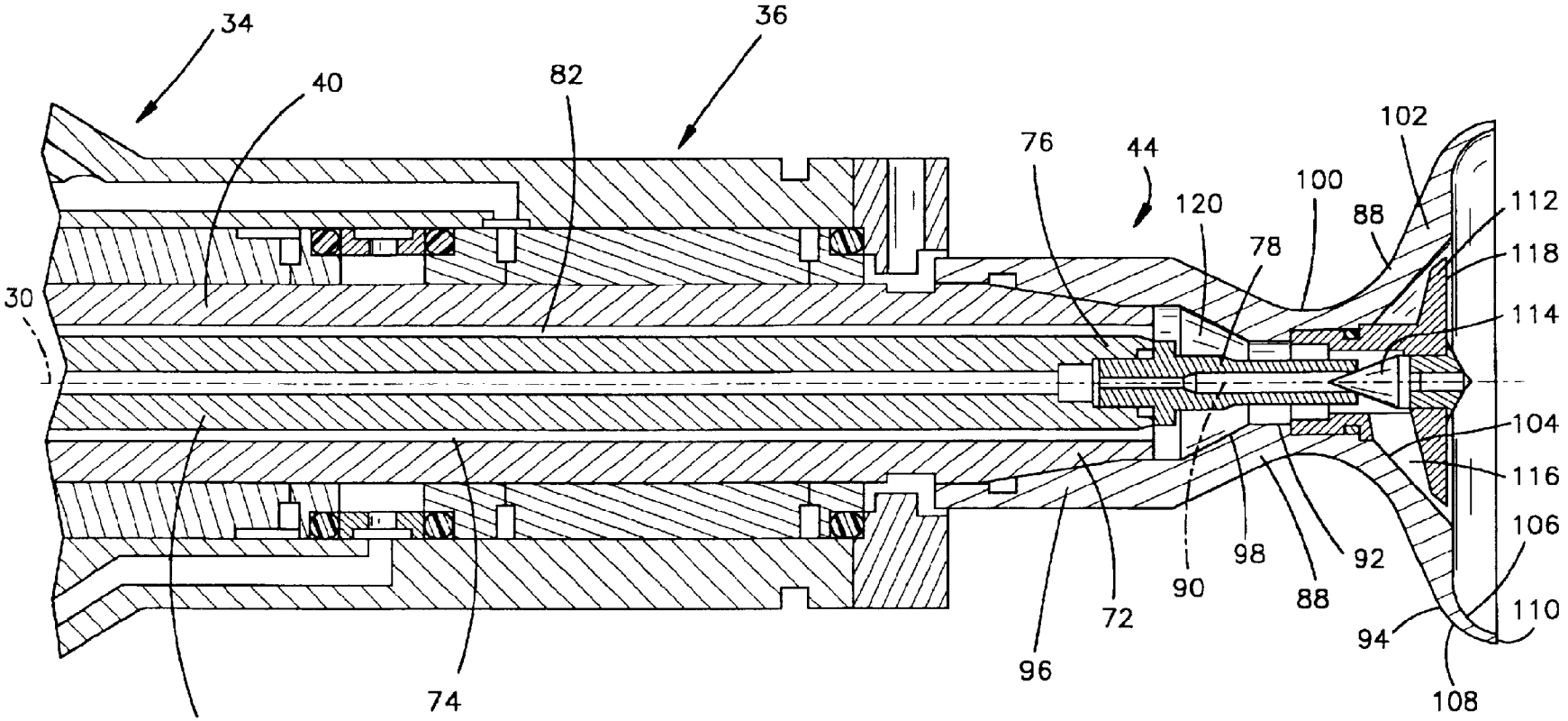
FIG. 2 is an enlarged partial sectional view of the rotary drive shaft assembled together with the atomizer cup.

An aspect of the embodiment of the invention, relating to the provision of exhaust air to the atomizer head or cup 44, relates to the assembly of the head or cup 44 onto the end of rotary drive shaft 40, as illustrated in FIGS. 1 and 2. The atomizer cup 44, as illustrated in FIGS. 1 and 2, has an hour glass-like shape and maybe uniformly constructed of the composite material including a low capacitance insulating material, an electrically conducting material, and a binder material as previously described in detail in application Ser. Nos. 08/834,290 and 08/404,355, which are expressly incorporated in their entireties by reference herein. Alternatively, the cup may be molded from insulative and conductive materials as shown in prior U.S. Pat. No. 4,887,770, which is hereby expressly incorporated in its entirety by reference herein.

As seen in FIGS. 1 and 2, rotary atomizing cup 44 for atomizing coating material is constructed of a rotatable cup body 88 having a hour glass-like shape and a longitudinal axis 90 extending therethrough which coincides with the axis of rotation 30 through the rotary atomizer 10 when cup 44 is mounted onto rotary drive shaft 40 so as to project outward from annular ring 24. Cup body 88 has an inner flow surface 92 adapted to direct flow of the liquid coating material through cup body 88 and an outer surface 94, which in turn, is adapted to direct flow of shaping and vectored air, as previously described in detail in application Ser. Nos. 08/834,290 and 08/404,355.

Turning now to the construction of the inner flow surface 92 of rotatable cup body 88, the base section 96 is adapted for mounting the cup body onto the free end of rotary drive shaft 40, by conventional means such as with a threaded connection. A nozzle receiving portion 98 located in an intermediate section 100 is adapted to receive nozzle 78 extending outward from feed tube 38 which in turn is projecting outward from rotary shaft 40. A distribution receiving portion 102 having a conical inner surface 104 is symmetrically disposed about longitudinal axis 90 and is adjoined to the nozzle receiving portion 98 at its inner smaller diameter end and to a forward flow surface 106 at its outer larger diameter end. The forward flow surface 106 is located in the frustroconically shaped end section 108 and terminates at an atomizing lip 110. The forward flow surface 106 forms a forward cavity across which charged coating material flows and is propelled radially outward across atomizing lip 110 to form atomized droplets of coating material adapted for application to a workpiece. Since the cup 44 is semi-conductive or has conductive portions, the coating material becomes charged as it flows in contact with the cup. Therefore, an atomized pattern of charged coating material is produced. The manner in which the paint is atomized by cup 44 is generally described in detail in application Ser. Nos. 08/834,290 and 08/404,355. The hour glass-like shape of rotary atomizing cup 44 in combination with the vectored air supply greatly reduces air usage and paint wrap back problems because of a low, i.e., substantially zero, differential pressure condition across atomizing lip 110. This is beneficial because it provides for improved flow pattern control and clean operation, and there is less tendency for paint wrapback, especially when the system is used in combination with the vectored air, as previously described.

The rotary atomizing cup 44 further includes a distributor 112 with a conical insert 114, as seen in FIGS. 1 and 2, mounted in the inner flow surface 104. The end of the conical insert 114 is disposed in the outlet end of the nozzle 78 and in spaced relation thereto to allow the coating material to flow into the flow passage 116 between the conical surface 104 and the end 118 of the distributor so that the coating material is forced to flow across flow surface 106 and then across the atomizer lip 110. The distributor 112 also directs the air flowing from the air passageway 82 into chamber 120 between the inner flow surface 92 and the nozzle 78 into the flow passage 116 where the air mixes with the coating material before flow across flow surface 106 and then across the atomizer lip 110.

In the operation of the electrostatic spray device, a flow of the liquid coating material is directed through a fluid tube 48 extending through and disposed within the rotary drive shaft 40. The rotary drive shaft is rotated by the air turbine motor 34 which simultaneously rotates the atomizer head 44. A first portion of the exhaust air from the air turbine motor 34 is directed through the cylindrically shaped air passage 82 and into the atomizer head 44 to create an air barrier within air passage 82 that prevents the liquid coating material being dispensed by the atomizer head from flowing back into air passage 82. The first portion of the air also serves to mix with the coating material within the atomizer head to improve the delivery of the atomized coating material. A second portion of the exhaust air from the air turbine motor flows through the plug 86 from the atomizer housing along an outer surface 62 of the front end section 14 of the atomizer housing 12.

Additional Embodiment of Atomizer Cup

Figure 4:
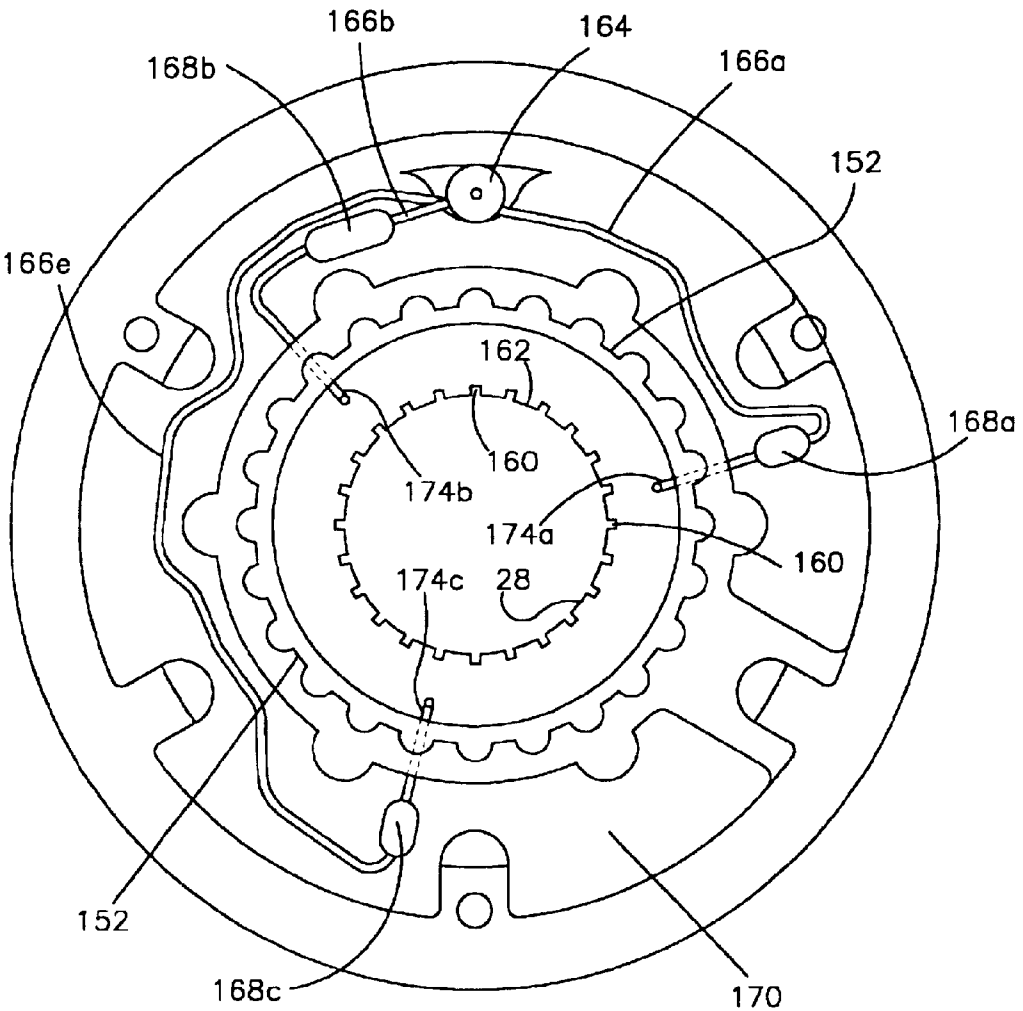
FIG. 4 is a rear view of the charge ring of FIG. 3 showing the resistors of a charging circuit embedded in the ring.
Figure 3:
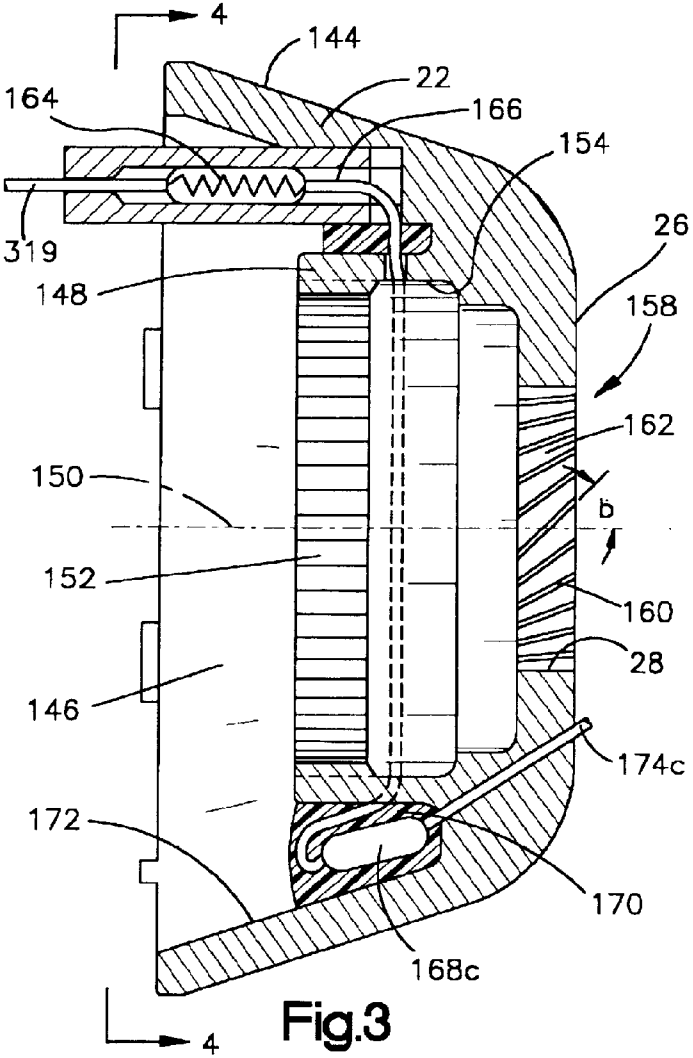
FIG. 3 is a side view, in cross section, of a charge ring disposed at the front end of the atomizer housing shown in FIG. 1, both for transferring high electrostatic charge to the atomizer head and for directing a flow of vectored air onto the atomizer head to prevent paint wrap back onto the atomizer housing and for shaping the spray of paint.
Figure 5:
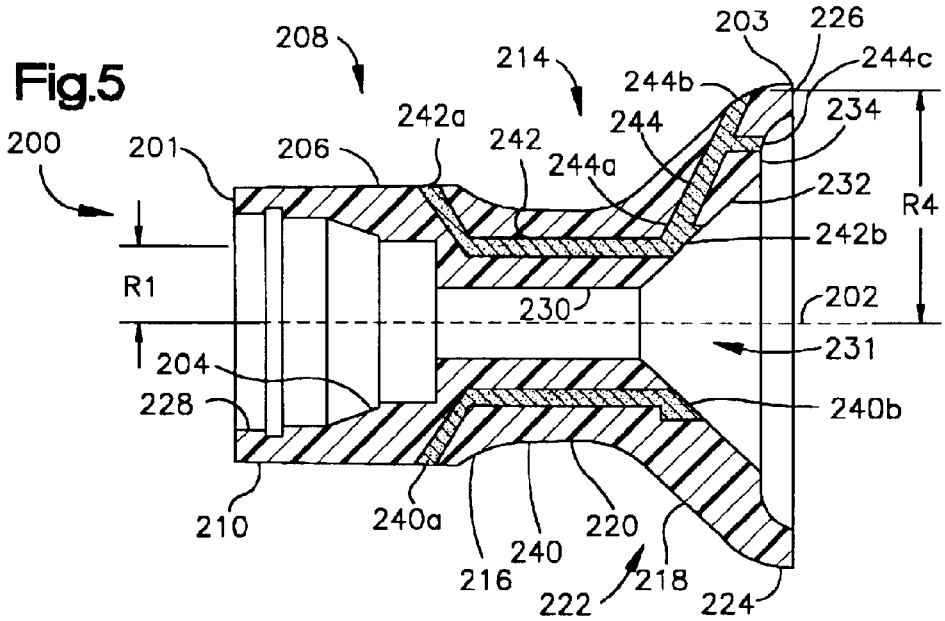
FIG. 5 is a cross-sectional side view, along line 5—5 of FIG. 7, of an improved rotary atomizer head having a plurality of conductive pathways embedded therein, in accordance with the invention.

There follows a discussion of another embodiment of an atomizer housing and cup 200, shown in FIGS. 3, 4 and 5, which is generally similar in size and shape to the previously-described atomizer cup 44, yet markedly different in certain respects from that and other atomizer cups as previously described in detail in application Ser. Nos. 08/834,290 and 08/404,355. As will become apparent, as a result of the differences in the atomizer cup 200, certain changes are also made to other components of the previously-described electrostatic, liquid spray, rotary atomizer 10.

It is required that spray devices, such as those described herein, must pass a FM Standard 7260 test. The 7260 test involves placing an electrostatic charge on the atomizer cup 44, 200 and placing the cup into a bag filled with propane. Then a ground ball, in other words a metal ball on the end of a rod, is brought near the cup. If a spark jumps from the cup to the ground ball and the propane ignites, the spray device fails the 7260 test. It is an object of the invention to provide an atomizer cup that facilitates passing the 7260 test.

Generally, whereas the previously-described atomizer cup 44 is constructed of a semi-conductive composite material including a low capacitance insulating material and an electrically conducting material and a binder material, the atomizer cup 200 of this embodiment is constructed primarily of a non-conductive material such as PEEK or PPS-Rayton (polyphenylene sulfide), with a plurality of conductive pathways embedded therein for carrying the electrical charge supplied by the power supply 32 from one end of the atomizer cup 200 to the other end of the atomizer cup 200.

Generally, the atomizer cup 200 is sized and shaped for use with an electrostatic, liquid spray, rotary atomizer 10, such as is illustrated in FIG. 1, which has an atomizer housing 12 and an air control element 22 incorporating an annular charge ring 24 with a circular bore 28 which is on an axis 150 which is coincident with a longitudinal axis of rotation 34 that extends through the atomizer housing 12. Such a rotary atomizer 10 would also have an internal power supply 32, located within and interior chamber 20 for generating high voltage electrostatic energy in the range of from about 30,000 volts DC to about 100,000 volts DC.

The atomizer cup 200 is comparable in many respects to the atomizer head 30 of FIGS. 1 and 2. The atomizer cup 200 is annular, has a one (rearward) end 201, another opposite (forward) end 203, an hour glass-like shape, a longitudinal axis 202 and a bore 204 extending therethrough. The longitudinal axis 202 coincides with the axis of rotation 30 through the rotary atomizer 10 when the atomizer cup 200 is mounted onto the rotary drive shaft 42 so as to project from annular ring 24. The atomizer cup 200 has an inner flow surface 204 (bore) that is adapted to direct flow of the coating material through the atomizer head 200 and an outer surface 206 that is adapted to direct the flow of shaping and vectored air.

The atomizer cup 200 includes a base section 208 symmetrically disposed about the longitudinal axis 202. The outer surface 206, in the vicinity of base section 208, has a cylindrical bottom surface portion 210. An intermediate section 214 of the atomizer cup 200, symmetrically disposed about the longitudinal axis 202, includes an outer surface formed of a first surface portion 216 which is adjoined to (contiguous with) the body surface portion 210 and tapers inward, a second surface portion 218 which tapers outward, and a concave intermediate surface portion 220 which extends between the first and second surface portions 216 and 218, respectively. A generally frustroconically shaped end section 222 is symmetrically disposed about the longitudinal axis 202 and has an outer surface 224 which intersects (is contiguous with) the second surface portion 218 of intermediate section 214 and terminates with a front edge surface 226 at the front end 203 of the atomizer cup 200. The bottom portion 210 is rearward of the intermediate section 214 which is rearward of the frustroconically shaped end section 222. Conversely, the frustroconically shaped end section 222 is forward of the intermediate section 214 which is forward of the bottom portion 210.

Turning now to the construction of the inner flow surface 204 of the atomizer cup 200, a mounting portion 228 in the base section 208 is at least partially threaded (not shown) and adapted for mounting the atomizer cup 200 onto the free end of the rotary drive shaft 40. A nozzle receiving portion 230 in the intermediate section 214 adjoins (is contiguous with) the mounting portion 228 and is adapted to receive the nozzle 78 extending outward from the feed tube 76 which is projecting outward from the rotary shaft 40.

The distribution receiving portion 231 of the atomizer head or cup 200 differs somewhat from the distribution receiving portion 104 of the cup 44. The distribution receiving 231 of cup 200 has a conical surface 232 which is symmetrically disposed about the longitudinal axis 202 and is adjoined to (contiguous with) the nozzle receiving portion 230 at its inner smaller diameter end and has a forward flow surface 234 which is of somewhat lesser radial extent than the forward flow surface 106. The forward flow surface 234 is similarly located in the frustroconically shaped end section 222 and terminates at an atomizing lip 226 which is the front edge 203. The forward flow surface 234 forms a forward cavity across which charged coating material flows and is propelled radially outward across atomizing lip 226 to form atomized droplets of coating material adapted for application to a workpiece.

The hour glass-like shape of the atomizing cup 200 in combination with the vectored air supply, as described herein, greatly reduces air usage and paint wrap back problems because of a low, i.e., substantially zero, differential pressure condition across the atomizing lip 226. This is beneficial because it provides for improved flow pattern control and clean operation, and there is less tendency for paint wrapback. While the improved pattern control results in a more uniform circular cloud of paint, there is still a slight tendency for the paint to wrapback because of the vacuum behind the atomizer cup 200. The vectored air works together with atomizer 200 to break up the vacuum and prevent paint wrapback and to shape the paint pattern, by reducing the diameter of the paint cloud.

Composition of the Atomizer Cup

The atomizer cups described hereinabove are constructed of a semi-conductive composite material including a low capacitance insulating material and an electrically conducting material and a binder material.

The atomizer cup 200 of this embodiment is constructed primarily of a non-conductive material such as PEEK or PPS-Rayton (polyphenylene sulfide), with a plurality of conductive pathways 240,242 embedded therein for carrying the electrical charge supplied by the power supply 32 along the length of the atomizer cup 200 from a position which is rearward of the intermediate section 214 to the frustroconically shaped end section 222 of the atomizer cup 200. The conductive pathways 240,242 are made of an electrically conducting material which is preferably a carbon containing material, and more particularly a carbon fiber. Other electrically conducting materials such as carbon black or particulate graphite can be used for the conductive pathways.

Figure 6:
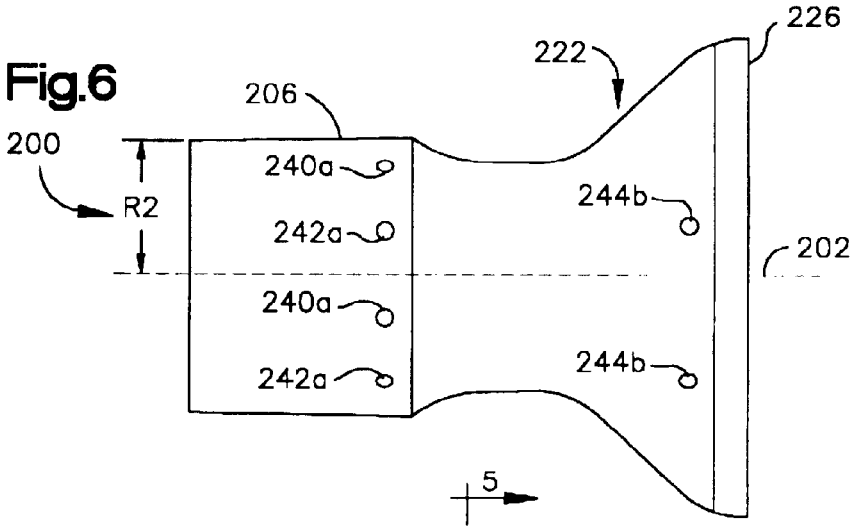
FIG. 6 is a side view of the improved atomizer cup of FIG. 5, showing the conductive pathways exiting an outer surface of the atomizer cup, in accordance with the invention.
Figure 7:
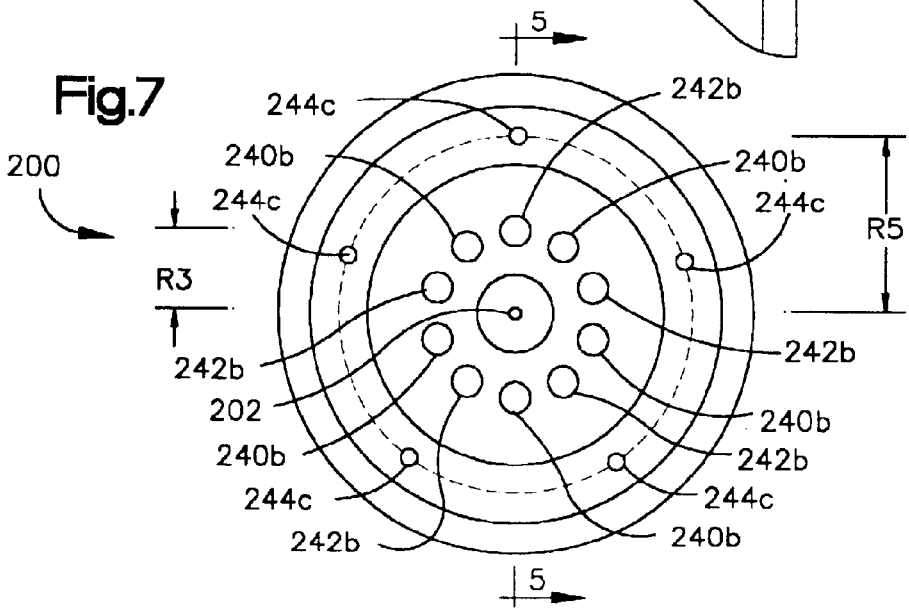
FIG. 7 is a front view of the improved atomizer cup showing ends of the conductive pathways exiting an inner surface of the atomizer cup, in accordance with the invention.

As shown in FIGS. 5, 6 and 7, a plurality (ten are shown) of conductive pathways 240,242 are formed in the body of the atomizer cup 200 and are of two types (sets).

A first type (set) of conductive pathway 240 is elongate and traverses the length of the atomizer cup 200 from its cylindrical bottom surface portion 210 to its frustroconically shaped end section 222, within the body of the atomizer cup 200. Each elongate conductive pathway 240 has a first end 240*a* which exits from within the body of the atomizer cup 200 so as to be exposed at an external surface of the cylindrical bottom surface portion 210, and has a second end 240*b* which exits from within the body of the atomizer cup 200 so as to be exposed at an internal surface 232 of the frustroconically shaped end section 222.

There are preferably five such elongate conductive pathways 240 disposed within the body of the atomizer cup at evenly-spaced intervals about the axis 202 at a first distance (radius) "R1" from the axis 202.

The five first ends 240*a* (only two of these first ends 240*a* are visible in the view of FIG. 6) of the five conductive pathways 240 exit the outer surface 206 of the bottom section 210 at evenly-spaced intervals at a second distance (radius) "R2" from the axis 202 which is the external radius of the bottom section 210.

The five second ends of 240*b* (all of which are visible in the view of FIG. 7) of the five conductive pathways 240 exit the inner surface 232 of the frustroconically shaped end section 222 at evenly-spaced intervals at a third distance (radius) "R3" from the axis 202 which is approximately equal to the first distance "R1" from the axis and which is typically less than the second distance "R2".

As best viewed in FIG. 5, the second ends 240*b*, or end portions, of the first elongate conductive pathways 240 are preferably enlarged (increased) in diameter(cross-dimension) as contrasted with the main body portion of the first elongate conductive pathways 240.

A second type (set) of conductive pathway 242 is elongate and traverses the length of the atomizer cup 200 from its cylindrical bottom surface portion 210 to its frustroconically shaped end section 222, within the body of the atomizer cup 200.

Each elongate conductive pathway 242 has a first end 242*a* which exits from within the body of the atomizer cup 200 so as to be exposed at an external surface of the cylindrical bottom surface portion 210, and has a second end 240*b* which exits from within the body of the atomizer cup 200 so as to be exposed at an internal surface 232 of the frustroconically shaped end section 222.

There are preferably five such elongate conductive pathways 242 disposed within the body of the atomizer cup at evenly-spaced intervals about the axis 202, preferably at the same first distance (radius) "R1" from the axis 202, preferably between adjacent ones of the first type of conductive pathways 240. The distances (R1) of the conductive pathways 240 and 242 from the axis 202 are preferably the same as one another, and are limited only by the thickness of the body portion of the atomizer housing 200.

The five first ends 242*a* (only two of these first ends 242*a* are visible in the view of FIG. 6) of the five conductive pathways 242 exit the outer surface 206 of the bottom section 210 at evenly-spaced intervals at the second distance (radius) "R2" from the axis 202 which is the external radius of the bottom section 210.

The five second ends of 242*b* (all of which are visible in the view of FIG. 7) of the five conductive pathways 242 exit the inner surface 232 of the frustroconically shaped end section 222 at evenly-spaced intervals, preferably at the same third distance (radius) "R3" from the axis 202.

However, it is within the scope of this invention that the distance from the axis 202 for the second ends 240*b* of the first elongate conductive pathways 240 need not all be the same as one another, that the distance from the axis 202 for the second ends 242*b* of the second elongate conductive pathways 242 need not all be the same as one another, and that the distance from the axis 202 for the second ends 242*b* of the second elongate conductive pathways 242 need not all be at the same distance from the axis 202 as the second ends 240*b* of the first elongate conductive pathways 240.

As best viewed in FIG. 5, the second ends 242*b*, or end portions, of the second elongate conductive pathways 242 are preferably enlarged (increased) in diameter(cross-dimension) as contrasted with the main body portion of the second elongate conductive pathways 242.

As described thus far, the second elongate conductive pathways 242 are suitably identical to the first elongate conductive pathways 240. The second elongate conductive pathways 242 differ from the first elongate conductive pathways 240 in the following manner. The second conductive pathways 242 have extension portions 244 which extend from the second ends 242*b* of the second conductive pathways 242, within the body of the frustroconically shaped end section 222 and branch off to exit both the outer and inner surfaces of the frustroconically shaped end section 222 near the front edge 226 of the atomizer cup 200.

The extension portions 244 of the second elongate conductive pathways 242 are suitably of the same material as the second elongate conductive pathways 242, are elongate, and have first ends 244*a* which are adjoined to(contiguous with) the second ends 242*b* of the second elongate conductive pathways 242. At opposite ends of the extension portions 244, each extension portion 244 branches off so as to have a first opposite end portion 244*b* which exits the outer surface portion 218 of the frustroconically shaped end section 222 near the front edge 226 of the atomizer cup 200 at a fourth distance (radius) "R4" from the axis 202, and a second opposite end portion 244*c* which exits the forward flow surface 234 of the frustroconically shaped end section 222 near the front edge 226 of the atomizer cup 200 at a fifth distance (radius) "R5" from the axis 202.

Suitable dimensions for the distances "R1", "R2", "R3" and "R4" and "R5" are: the distance "R1" is approximately 0.390–0.395 inches; the distance "R2" is approximately 0.6115–0.6130 inches; the distance "R3" is approximately 0.390–0.395 inches; the distance "R4" is approximately 0.900 inches; and the distance "R5" is approximately 0.700 inches.

The atomizer cup 200 made of a non-conductive material with conductive passageways embedded therein provides a noticeable improvement over the semiconductive atomizer cup 44 with respect to passing the FM Standard 7260 test.

The conductive pathways 240 and 242 (including extension 244) can be conductive or semi-conductive and have a resistivity measured in ohm-centimeters (ohms times centimeters). Analytically, each cup 200 and the particles (e.g., paint particles) being charged (i.e., the charging process) have an impedance, and it important to "match" these impedances for maximum transfer efficiency and, consequently, to minimize the amount of power dissipated (heat generated) in the cup 200. As the resistivity decreases, the cup becomes more conductive and more current flows at a given potential difference, thereby increasing power dissipated in the cup. It has been found that a workable resistivity range is between 104 and 106 ohm-centimeters. The cup is preferably produced to be closest to the higher end of this resistivity range to ensure that the cup passes the 7260 test.

The number and cross-sectional dimensions of the conductive pathways 240 and 242 also affects the transfer efficiency. As fewer (e.g., than 10) pathways are used, the transfer efficiency goes down. There is, of course, a design limitation on making the diameter of the pathways 240 and 242 much smaller than 0.065 inches, because of manufacturing (e.g., injection molding) limitations, and they must be small enough to fit (be embedded) within the body of the cup. A suitable diameter (cross-dimension) for the first and second pathways 240 and 242 themselves, and their first ends 240*a* and 242*a,* respectively is 0.095 inches. The larger (increased cross-dimension) second ends 240*b* and 242*b* are limited in size so that they don't touch each other and form a conductive ring (annulus) on the inside surface of the cup. It is believed that having such a conductive ring on the front inside surface of the cup would cause too much charge to accumulate on its front surface, thereby causing the cup to fail the 7260 test. The circular cross-section of the pathways and their ends is somewhat arbitrary, and is limited only by manufacturing processes.

Conveying Charge to the Conductive Pathways

Figure 11:
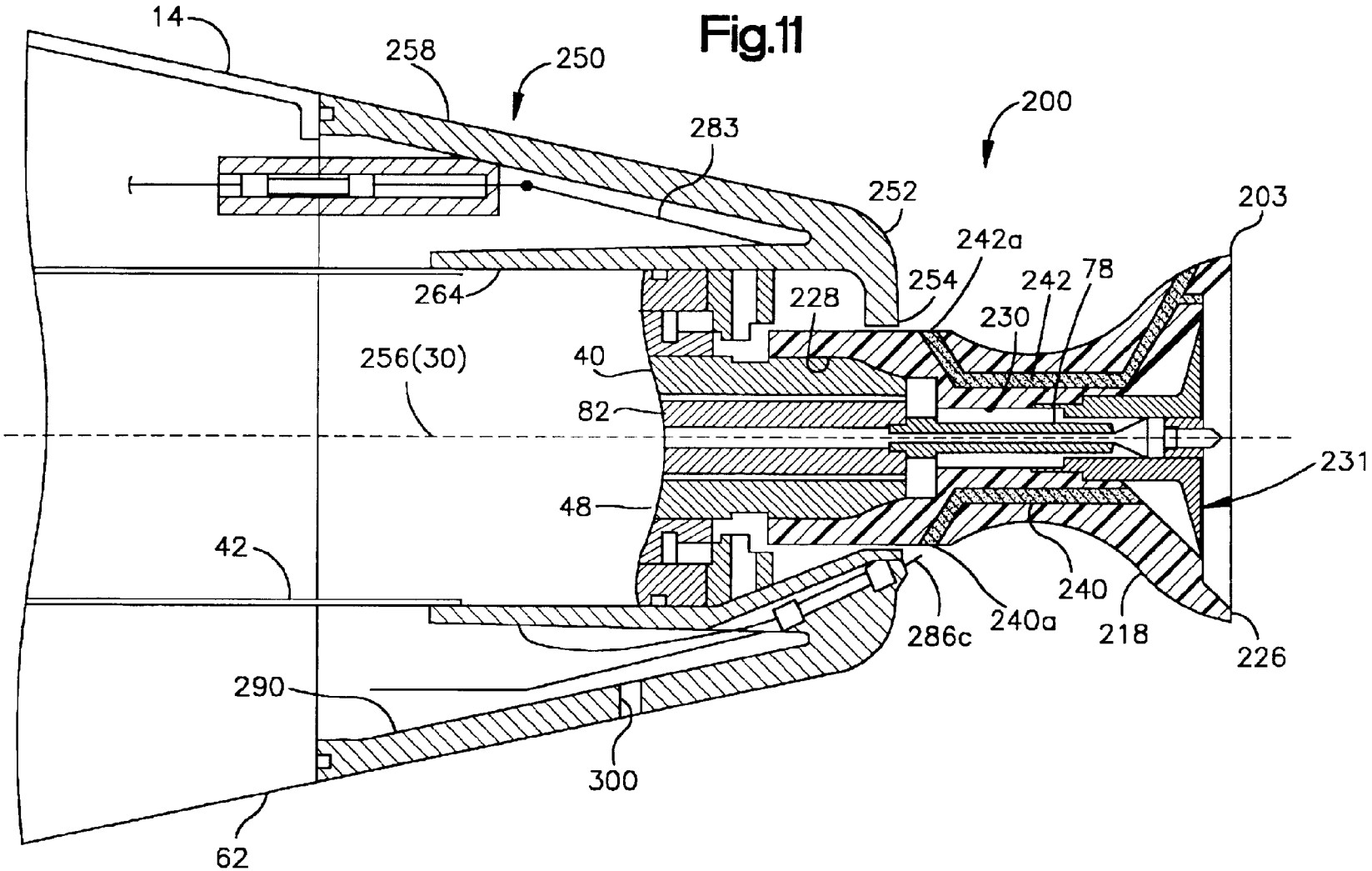
FIG. 11 is a side view, in cross section, of a charge ring disposed at the front end of the atomizer housing shown in FIG. 1 and to which is mounted the atomizer cup of FIGS. 5, 6 and 7.

As mentioned above, as a result of the differences between the atomizer cup 200 and the atomizer cup 44, certain changes are also appropriately made to other components of the electrostatic, liquid spray, rotary atomizer 10 to which the atomizer cup 200 is mounted, as shown in FIG. 11.

The previously-described electrostatic, liquid spray, rotary atomizer 10 incorporates an annular charge ring 22, shown in detail in FIGS. 3 and 4, as previously described in detail in application Ser. Nos. 08/834,290 and 08/404,355, which is detachably mounted to the front surface 23 of the forward section 14 of the atomizer housing. The annular ring 22 has a front wall 26 provided with a circular bore 28 about an axis 150 which is coincident with a longitudinal axis of rotation 30 that extends through the atomizer housing 12.

There follows a discussion of another embodiment of an annular charge ring 250, as shown in FIGS. 8 and 11 which is generally similar in size and shape to the previously described annular ring 22, yet markedly different in certain respects from the previously-described annular ring 22.

The annular charge ring 250 has an outer surface 258 which is tapered inward from the forward section 14 of the atomizer housing 12 to the front wall 252 which has a circular throughbore 254 about an axis 256 which is coincident with a longitudinal axis of rotation 30 that extends through the atomizer housing 12 and coincident with the longitudinal axis 202 of the atomizer cup 200 when the cup 200 is mounted within the charge ring 250. The inner chamber 260 of the annular ring 250 has a flow directing section formed of a generally cylindrical wall 264 which is symmetrically disposed about the longitudinal axis 256. When the annular ring 250 is mounted onto the rotary atomizer housing 14, the longitudinal axis 256 coincides with the axis of rotation 30 through the rotary atomizer 10. These features are similar to the corresponding features of the annular ring 22.

Preferably, but not necessarily, a plurality of ribs 262 are evenly spaced and disposed in parallel relation with the axis 256 along the inner surface 264 of the cylindrical wall 262. The ribs 262 are sized to engage the outer surface of turbine housing 42 when the annular ring 250 is assembled with conventional means, such as screws, to the front surface 23 of forward section 14. The open passageways between the ribs 262 and the turbine housing 42 provide a flow path for the vectored air to flow in the forward direction through the circular wall 264. The annular ring 250 includes air control members 266 formed in circular bore 254 for directing the flow of vectored air around the atomizing head 44, as discussed in more detail hereinabove. The air control members 266 include a plurality of slots 268 extending outward from the airflow surface 270 of the circular bore 254 which suitably are angled and spaced from one another in the manner of the annular ring 22, as previously described in detail in application Ser. Nos. 08/834,290 and 08/404,355 to direct flow of vectored air against the surface of atomizer cup 200. These features, and the advantages accruing to same, are similar to the corresponding features of the annular ring 22.

Figure 9:
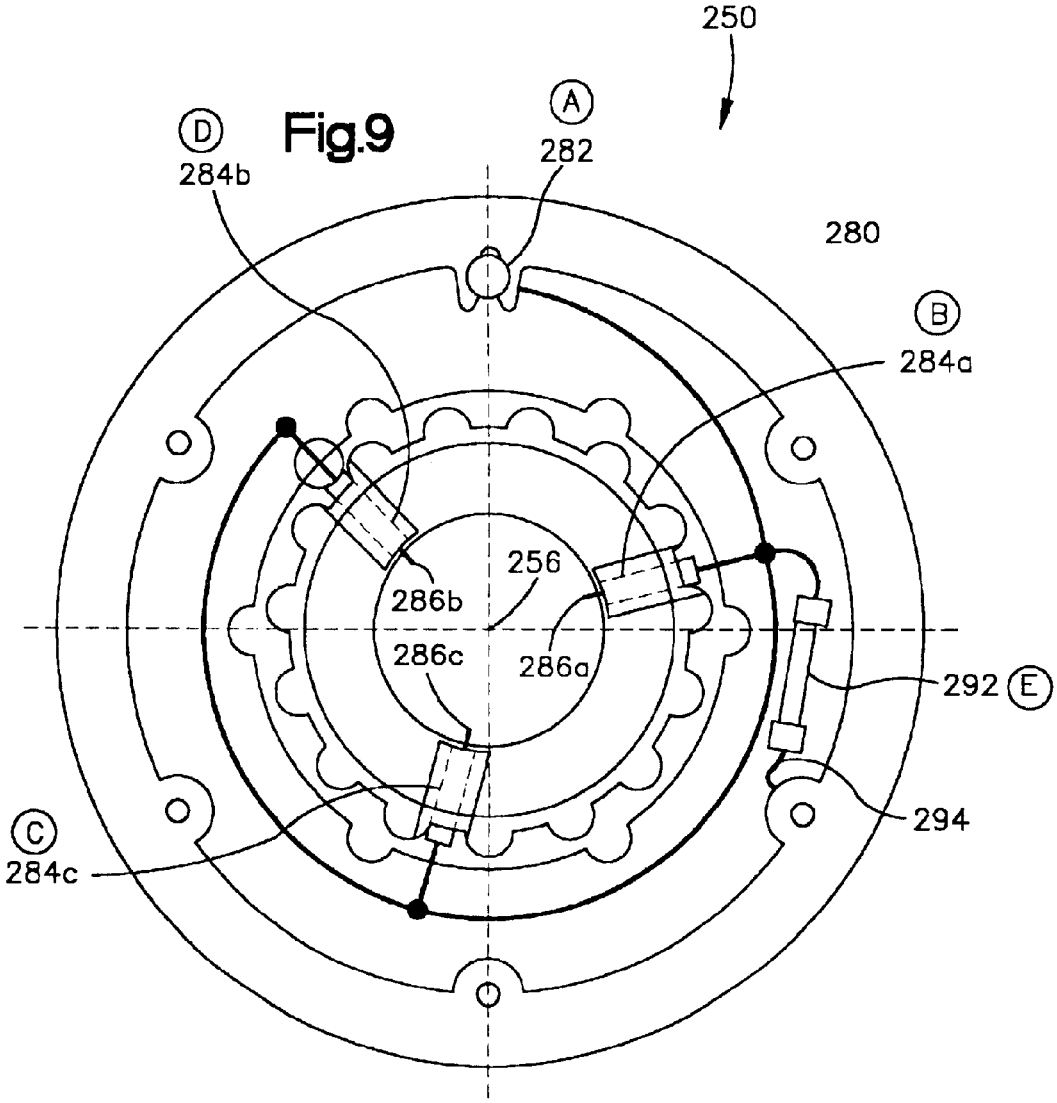
FIG. 9 is a rear view of the charge ring of FIG. 8 showing the charge ring and placement of resistors, in accordance with the invention.
Figure 10:
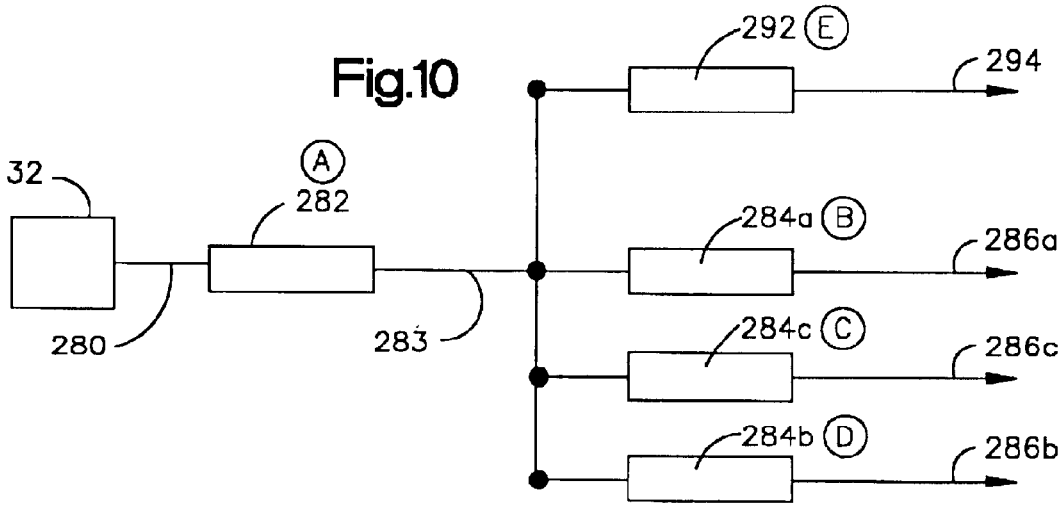
FIG. 10 is block diagram of a charge ring circuit particularly adapted to convey charge from the power supply to the atomizer cup, in accordance with the invention.

The design of the annular charging ring 250 differs from that of the annular ring 22 in the following respects. As shown in FIGS. 8, 9 and 10, high voltage electrostatic energy is transferred from the power supply 32 via an electrical circuit including a conductor 280 (compare 319 of ring 22). A resistor "A" 282 (compare 164) which has one end connected to the conductor 280 is mounted within the annular ring 250 in a cylindrical housing 281. Another end of the resistor "A" 282 is connected with a conductor 283. Three resistors 284*a,* 284*b* and 284*c* (compare resistors 168*a,* 168*b,* 168*c*), also labeled "B", "D" and "C", respectively, each having one end connected to the conductor 283 and each having a cup-charging electrode 286*a,* 286*b* and 286*c* (compare electrodes 174*a,* 174*b,* 174*c*) extending from another end thereof, are potted with an epoxy material into a channel 288 (compare 170) between the cylindrical wall 264 (compare 148) and the inner surface 290 (compare 172) of the annular ring 250 (compare 22). Another resistor 292, labeled "E", is connected at one end to the conductor 280 and has an electrode 294 extending from its other end.

The electrodes 286*a,* 286*b* and 286*c* ("B", "D" and "C") are electrostatic charging and field electrodes projecting from the front surface of wall 26 of the annular charging ring 250. The resistors 284*a,* 284*b* and 284*c* lower the spark potential at the electrodes 286*a,* 286*b* and 286*c,* respectively. Although there are only three of these electrodes 286*a,* 286*b* and 286*c,* it must be remembered that the atomizer cup 200 is rotating so that the first ends of all ten first ends of conductive pathways 240 and 242 will pass in close proximity to each of the three electrodes 286*a,* 286*b* and 286*c* to receive electrostatic charge therefrom.

A non-conducting end cap or ferrule 296 is disposed over the electrode end of each of the charging resistors 284*a,* 284*b* and 284*c* so that, as best viewed in FIG. 8 which shows one charging resistor 284*c* and one electrode 286*c,* the charging electrode projects through the end cap 296. When the atomizer cup 200 is fitted within the front opening 254 of the charge ring 250, the first ends 240*a* and 242*a* of the conductive pathways 240 and 242, respectively, are positioned to be as close as possible to the ends of the charging electrodes (286*a,* 286*b* and 286*c*). Preferably, the first ends 240*a* and 242*a* are no greater than 0.200 inches away (longitudinally) from the ends of the charging electrodes 286*a,* 286*b* and 286*c* when the atomizer cup 200 is mounted to the annular charging ring 250 to keep the gap therebetween to a minimum. A minimal amount of clearance, for example 0.020 inches is generally desirable to avoid mechanical wear between the rotating atomizer cup 200 and ends of the charging electrodes 286*a,* 286*b* and 286*c*.

Referring to FIG. 8A, an access hole 300 is provided in the outer wall to extend through the annular charging ring 250 to create an approach way to reach the drive shaft within the interior of the atomizer housing. This access hole 300 permits the insertion of a rigid, elongate tool (not shown) such as an Allen wrench into the outer wall of the annular charging ring which will engage a corresponding recess (hole) in the surface of the rotary drive shaft 40 so that the rotary drive shaft may be prevented from freely rotating. This permits the operator to quickly demount the atomizer cup 200 for cleaning or replacement, without requiring dismantling the charge ring 250.

In order to ensure the airtight integrity of the annular charge ring 250, a check valve such as a "duckbill" valve 302 is disposed in the access hole 300 between an inlet orifice 304 and an outlet orifice 306 thereof. In this manner, the airtightness of the charge ring 250 is maintained to ensure the desired flow of vectored air therethrough.

The access hole 300 forms an air gap through which electrostatic charges can leak, thereby compromising the ability to pass the FM 7269 test. Therefore, a small electrode 294 from the resistor 292 ("E") is inserted into the charge ring 250 near the access hole 300. The resistor 292 is preferably of high resistance, such as 50 megohms. In this manner, a small (low) voltage will be present in the vicinity of the access hole 300, and a small spark that is insufficient to ignite the propane used in the FM 7260 test may be generated at the access hole 300. If the electrode 294 were not provided near the access hole 300, the ground ball used in the FM 7260 test would pull voltage off the rotary drive shaft 40. This is because the rotary drive shaft is not grounded and, in use, will eventually charge to the full voltage potential of the power supply 38. In this manner the atomizer cup 200 can quickly be changed, without the need to first remove the annular ring 250.

The addition of a fourth resistor 292 and a fourth probe electrode 294 which are different in function than the three charging resistors 284*a,* 284*b* and 284*c* and corresponding charging electrodes 286*a,* 286*b* and 286*c,* respectively, is a key difference between the charging ring 22 and the charging ring 250. The result of incorporating a charging ring 250 in combination with a rotary cup 200 is a low capacitance, rotary atomizer that is able to pass the FM 7260 test.

Rotary Atomizer Mounted on Robot

Figure 12:
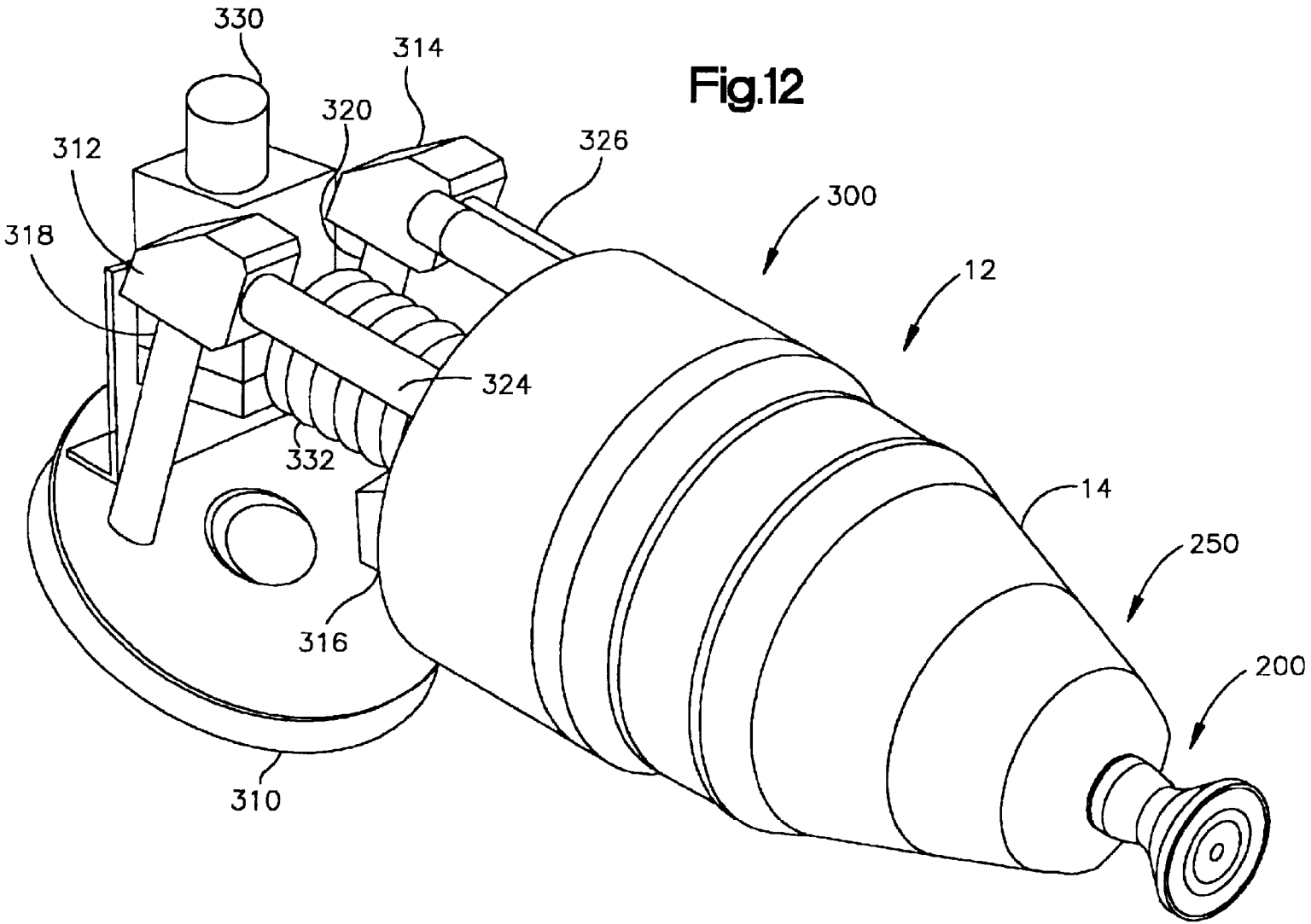
FIG. 12 is a three-dimensional view of a rotary atomizer for transferring high electrostatic charge to an improved rotary atomizer cup mounted onto a robot, in accordance with the invention.
Figure 13:
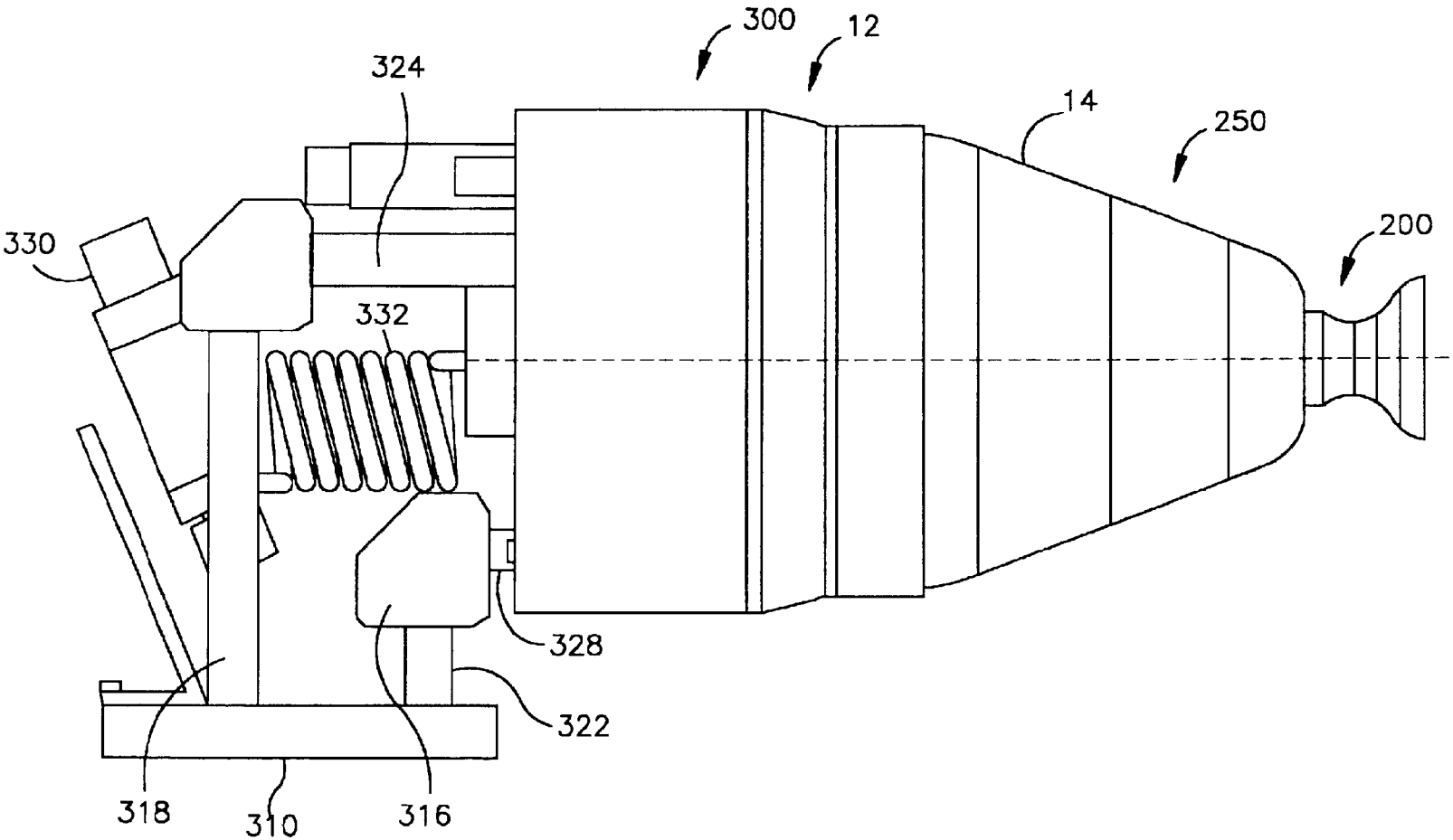
FIG. 13 is a side view of the rotary atomizer as shown in FIG. 12.

Referring to FIG. 12, there is illustrated a low capacitance, rotary atomizer 300 having a annular charge ring 250 mounted to the forward section 14 of the atomizer housing 12. As shown in FIG. 11, a atomizer cup 200 is mounted to the electrostatic liquid spray, rotary atomizer 300, as shown in detail in FIG. 11. The rotary atomizer 300 is mounted to a robot arm 310 which in turn is secured to a conventional industrial robot, the details of which are not part of the present invention. The rear of the manifold plate of rotary atomizer 300, such as plate 52 shown in FIG. 1, is mounted to three support structures 312, 314 and 316. Each of the support structures 312, 314 and 316 has a first support rod 318, 320 and 322, respectively, which are secured at one end to the robot arm 310. The support structures 312, 314, 316 also have second support rods 324, 326 and 328, respectively, which extend at a transverse angle (typically about 90 degrees to the vertical support 312, 314 and 316 rods 318, 320 and 322, respectively, and which are attached the rear end of the rotary atomizer 300, preferably to the manifold plate, such as manifold plate 52. A supply or control valve device 330 provides a supply of the coating material to the air operated valve 50 by a passageway (not shown). The supply valve 330 is connected to the flow passageway in the manifold plate leading to the air operated valve 50 through a tube 332 formed into an elongated spiral for the majority of its length. The spiral tube is preferably made of Teflon because of its good insulation or dielectric properties and because it has been found to be impermeable to solvents used in many of the paints being sprayed with the rotary atomizer 300. The tube 332, being in the shape of a spiral, extends the length of the fluid path from the supply device 330 to the rotary cup 200 and forms a voltage isolator that is long enough to increase the total electrical resistance of the paint column between the rotary atomizer 300 and the supply valve 330 to reduce the electrical current through the paint column to an extent that the paint being charged at the rotary cup 200 does not build up a charge in the rotary atomizer which could cause a potential hazard to an operator or cause the rotary atomizer 300 to fail the FM7260 test. In the preferred embodiment, the spiral tube 332 is about four feet in length and the control valve 330 is grounded.

It is apparent that there has been provided in accordance with this invention an apparatus and method that satisfies the objects, means and advantages set forth before. An improved electrostatic rotary atomizing spray device has an improved rotary, high speed, atomizing cup with a plurality of conductive pathways for transferring electrostatic energy from the electrodes of a charge ring to the paint without igniting the propane used in the FM 7260 test. An access hole in the charge ring for insertion of a tool to restrain free rotation of the turbine shaft to which the atomizer cup is secured facilitates quick demounting of the atomizer cup for cleaning or replacement. An additional electrode in the electrical circuit and disposed in the access hole of the charge ring presents a low voltage in the vicinity of the access hole for providing a small spark that is insufficient to ignite the propane used in the FM 7260 test. The rotary atomizer with the improved charge ring and rotary cup can be mounted to a robot and provided with an elongated spiral passageway connecting the supply pump to the rotary atomizer to increase the electrical resistance between the atomizer and the supply pump so that insufficient electrical charge will be present in the passageway carrying paint to the rotary cup to ignite the propane used in the FM 7260 test.

While the invention has been described in combination with embodiments thereof, it is evident that many alternatives, modifications, and variations will be apparent to those skilled in the art in light of the foregoing description. Accordingly, the invention is intended to embrace all such alternatives, modifications and variations as fall within the spirit and scope of the appended claims.

We claim:

1. An atomizer cup for an electrostatic rotary atomizing spray device for spraying a liquid coating material, comprising:

a body formed primarily of a non-conductive material, having a one end, an other opposite end, a bore extending therethrough from the one end to the other end, an outer surface, a rear section and a generally frustroconically shaped forward section, the forward section having a front surface; and a conductive pathway embedded within the body for conducting an electrical charge [from the outer surface to the front surface], the conductive pathway having two ends, a first end [extending to the front surface and further comprising an extension portion which extends within the body from the conductive pathway to one of] *terminating proximate a source of electrical energy and a second end terminating at* the outer [or front surfaces] *surface* of the body of the atomizer cup.

2. The atomizer cup of claim 1 wherein the extension portion extends within the body from the conductive pathway to both the outer surface and the front surface of the body of the atomizer cup.

3. The atomizer cup of claim 2 further including a plurality of the conductive pathways embedded within the body for conducting the electrical charge wherein the conductive pathways are provided as two sets of conductive pathways:

a first set of conductive pathways having two ends, a first end exiting the outer surface of the rear section and a second end, opposite the first end, exiting the inner surface of the frustroconically shaped end section; and a second set of conductive pathways having two ends, a first end exiting the outer surface of the rear section and a second end, opposite the first end, exiting the inner surface of the frustroconically shaped end section and further comprising extension portions which extend within the body of the frustroconically shaped end section from the second ends of the second conductive pathways and branch off to exit both the outer and inner surfaces of the frustroconically shaped end section of the atomizer cup.

4. An electrostatic rotary atomizing spray device, comprising:

an atomizer housing defining an interior chamber therein;

a rotary drive shaft extending at least partially through the interior chamber of the atomizing housing, the rotary drive shaft mounted at a first end to a motor disposed in the atomizer housing and at a second end to an atomizing cup located outside of the atomizer housing, the atomizer cup comprising:

a body formed primarily of a non-conductive material, having a one end, an other opposite end, a bore extending therethrough from the one end to the other end, an outer surface, a rear section and a generally frustroconically shaped forward section, the forward section having a front surface; and a conductive pathway embedded within the body for conducting an electrical charge from the outer surface to the front surface, the conductive pathway having two ends, a first end extending to the front surface and further comprising an extension portion which extends within the body from the conductive pathway to one of the outer or front surfaces of the body of the atomizer cup; and a circuit for transferring a high voltage electrostatic charge from a power supply to an electrode which projects out of the forward end of the atomizer housing, the electrode having an end positioned proximate to the first end of the conductive pathway to transfer electrical charge to the conductive pathway.

5. The atomizer cup of claim 4 wherein the extension portion extends within the body from the conductive pathway to both the outer surface and the front surface of the body of the atomizer cup.

6. An atomizer cup for an electrostatic rotary atomizing spray device for spraying a liquid coating material, comprising:

a body formed primarily of a non-conductive material, having an outer surface and an inner surface; and at least one elongate conductive pathway embedded within the body for conducting an electrical charge from a first end of the conductive pathway [at an outer surface of the cup] *terminating proximate a source of electrical energy* through the body of the cup to an opposite end of the conductive pathway [having first and second opposite ends, wherein said first opposite end] *which* terminates at said outer surface of the body [and said second opposite end terminates at said inner surface of the body].

7. The atomizer cup of claim 6 wherein the conductive pathway carries the electrical charge from a position on a rear section to a frustoconically shaped end section of the atomizes cup.

8. The atomizer cup of claim 6 wherein the conductive pathway is disposed within the body of the atomizer cup at evenly-spaced intervals about a longitudinal axis of the atomizer cup.

9. The atomizer cup of claim 6 wherein a second end portion of each conductive pathway is of increased cross-dimension.

10. The atomizer cup of claim 6 wherein a plurality of elongate conductive pathways are disposed within the body of the atomizer cup at evenly-spaced intervals about a longitudinal axis of the atomizer cup at a first distance from the longitudinal axis and the conductive pathways each have two ends;

a first end exiting the outer surface of a bottom section of the atomizer cup at evenly-spaced intervals at a second distance from the longitudinal axis; and a second end, opposite the first end, exiting the inner surface of a frustoconically shaped end section of the atomizer cup at evenly-spaced intervals at a third distance from the longitudinal axis which is approximately equal to the first distance.

11. The atomizer cup of claim 6 wherein at least five elongate conductive pathways are embedded within the body.

12. The atomizer cup of claim 11 wherein ten elongate conductive pathways are embedded within the body.

13. The atomizer cup of claim 6 wherein a plurality of conductive pathways are provided as two sets of conductive pathways:

a first set of conductive pathways having two ends, a first end exiting the outer surface of a rear section of the atomizer cup and a second end, opposite the first end, exiting the inner surface of a frustoconically shaped end section of the atomizer cup; and a second set of conductive pathways having two ends, a first end exiting the outer surface of the rear section and a second end, opposite the first end, exiting the inner surface of the frustoconically shaped end section and further comprising extension portions which extend within the body of the frustoconically shaped end section from the second ends of the second conductive pathways and branch off to exit both the outer and inner surfaces of the frustoconically shaped end section of the atomizer cup.

14. The atomizer cup of claim 13 wherein:

the first set of conductive pathways are disposed at evenly-spaced intervals about a longitudinal axis of the atomizer cup; and the second set of conductive pathways are disposed at evenly-spaced intervals about the longitudinal axis.

15. The atomizer cup of claim 14 wherein the second set of conductive pathways are disposed between adjacent ones of the first set of conductive pathways.

16. The atomizer cup of claim 15 wherein at least five of the first set of elongate conductive pathways and at least five of the second set of elongate conductive pathways are embedded within the body.

17. The atomizer cup of claim 13 wherein the extension portions have first ends which are contiguous with the second ends of the second elongate conductive pathways, a first opposite end portion which exits the outer surface of the frustroconically shaped end section of the atomizer cup, and a second opposite end portion which exits a forward flow surface of the frustroconically shaped end section of the atomizer cup.

18. The atomizer cup of claim 17 wherein the first opposite end portions of the extension portions exit the outer surface of the frustoconically shaped end section at a fourth distance from a longitudinal axis of the atomizer cup, and the second opposite end portions of the extension portions exit the forward flow surface of the frustoconically shaped end section at a fifth distance from the longitudinal axis.

19. The atomizer cup of claim 6 wherein said inner surface comprises a frustroconically shaped section, a forward flow surface section and a front edge section, said second opposite end of said conductive pathway terminates at one of said inner surface sections.

20. An electrostatic rotary atomizing spray device for spraying a liquid coating material, comprising:

an atomizer housing which defines an interior chamber therein;

a charging ring having a front wall with a circular bore therethrough mounted to the atomizer housing;

a drive shaft within the interior chamber of the atomizer housing and extending exterior of the atomizer housing through the circular bore of the charging ring, the drive shaft being attached at a first end to a motor within the atomizer housing and at a second opposite end to a rotary atomizer head; and an access hole extending through the charge ring to create an approach way to reach the drive shaft within the interior of the atomizer housing.

21. The electrostatic rotary atomizing spray device of claim 20 further comprising a check valve disposed within the access hole.

22. The electrostatic rotary atomizing spray device of claim 20 further comprising an electrode disposed near the access hole for providing a low voltage at the access hole.

23. The electrostatic rotary atomizing spray device of claim 20 further comprising:

the atomizing head at least partially extending into the circular bore of the charge ring to define an air gap between the atomizing head and the circular bore; and a circuit for transferring a high voltage electrostatic charge from a power supply, through the charge ring and across the air gap into the atomizing head, the circuit including a first resistor connected to the charge ring for transferring the high voltage electrostatic charge from the power supply to the charge ring, a plurality of second resistors mounted in the charge ring and connected to the first resistor, and a third resistor mounted in the charge ring and connected to the first resistor;

a plurality of first electrodes which project out of the front wall of the charge ring for providing concentrated charge on an outer surface of the charge ring, the plurality of first electrodes being electrically connected to the second resistors for lowering the spark potential of the electrodes; and a second electrode which projects into the access hole extending through the charge ring.

24. A method of constructing a rotary atomizer cup, comprising the steps of:

forming the rotary atomizer cup of a non-conductive material;

embedding a plurality of conductive pathways within the rotary atomizer cup, with a first end of each conductive pathway exiting an outer surface of the one end of the rotary atomizer cup and a second end of each conductive pathway exiting an inner surface of the opposite end of the rotary atomizer cup; and embedding a plurality of elongate conductive extension portions within the rotary atomizer cup, each extension portion having a first end which is contiguous with the opposite end of at least a portion of the plurality of conductive pathways and a second opposite end which branches off to exit both the outer and inner surfaces of the opposite end of the rotary atomizer cup.

25. A method of removing a rotary cup from an electrostatic rotary atomizing spray device, the spray device having an atomizer housing which defines an interior chamber therein, a drive shaft within the interior chamber of the atomizer housing, the drive shaft being attached at a first end to a motor within the atomizer housing and at a second opposite end to the rotary atomizer cup, comprising the steps of:

inserting a rigid elongate tool through an access hole in the atomizer housing so that an end of the rigid elongate tool enters a recess in the drive shaft, thereby preventing the drive shaft from freely rotating; and unscrewing the rotary atomizer cup from the drive shaft with the rigid elongate tool preventing the drive shaft from freely rotating.

26. A rotary atomizer system including a rotary atomizer and a robot mounting, the system comprising:

an atomizer housing defining an interior chamber therein having a rotary drive shaft extending therethrough and mounted to an atomizing cup located outside of the atomizer housing, the cup having a high voltage electrostatic charge transferred thereto, a fluid type being disposed within the drive shaft for directing a flow of the liquid coating material to the atomizer head where electrical charge is transferred to the liquid coating material passing through the atomizer cup, a robot mounting ring having an electrically grounded liquid supply control device by an elongated spiral passageway to increase the electrical resistance between the atomizer and the liquid supply so that a very small electrical charge will be present in the passageway carrying paint to the rotary cup.

27. A rotary atomizer system, the system comprising:

a rotary atomizer having an atomizing cup projecting outward thereof, a fluid tube being disposed within the rotary atomizer for directing a flow of the liquid coating material to the atomizer head where the liquid coating material is electrically charged as it passes through the atomizer cup;

a robot mounting arm having an electrically grounded, liquid supply control device attached thereto; and a voltage isolator connecting the fluid tube in the rotary atomizer to the electrically grounded, liquid supply control device to prevent electrical current from being transferred through the liquid coating material being charged at the rotary cup to the control device.

28. The rotary atomizer system of claim 27 wherein:

the rotary atomizer is a low capacitance rotary atomizer; and the voltage isolator is a spiral tube.

*29. An atomizer cup for an electrostatic rotary atomizing spray device for spraying liquid coating material, the cup being comprised of a first material and a second material which is electrically more conductive than the first material, the cup being principally comprised of the first material and having and outer surface and an inner flow surface, the cup being embedded with elongated pathways of the second material, one or more of the pathways having a first end which terminates proximate a source of electrical energy and a second end which terminates at the outer surface of the cup.*

*30. The atomizer cup of claim 29 wherein one or more of the conductive pathways has a first end which terminates proximate the source of electrical energy and a second end which terminates at the inner flow surface.*

*31. The atomizer cup of claim 29 wherein one or more of the conductive pathways has a first end which terminates proximate a source of electrical energy and a second and which is split into first and second portions, the first portion terminating at the outer surface and the second portion terminating at the inner flow surface.*

*32. A rotary atomizer, comprising: a housing formed of an electrically nonconductive material having an interior chamber, and air turbine disclosed within the interior chamber, the air turbine having a output shaft, an atomizer cup mounted on the output shaft, a paint feed tube which supplies paint to the atomizer cup, the cup being comprised of a first material and a second material which is electrically more conductive than the first material, the cup being principally comprised of the first material and having and outer surface and an inner flow surface, the cup being embedded with elongated pathways of the second material, one or more of the pathways having a first end which terminates proximate a source of electrical energy and a second end which terminates at the outer surface of the cup.*

*33. The rotary atomizer of claim 32 wherein one or more of the conductive pathways of the atomizer cup has a first end which terminates proximate the source of electrical energy and a second end which terminates at the inner flow surface.*

*34. The rotary atomizer of claim 32 wherein one or more of the conductive pathways of the atomizer cup has a first end which terminates proximate a source of electrical energy and a second and which is split into first and second portions, the first portion terminating at the outer surface and the second portion terminating at the inner flow surface.*

* * * * *